UNITED STATES PATENT OFFICE.

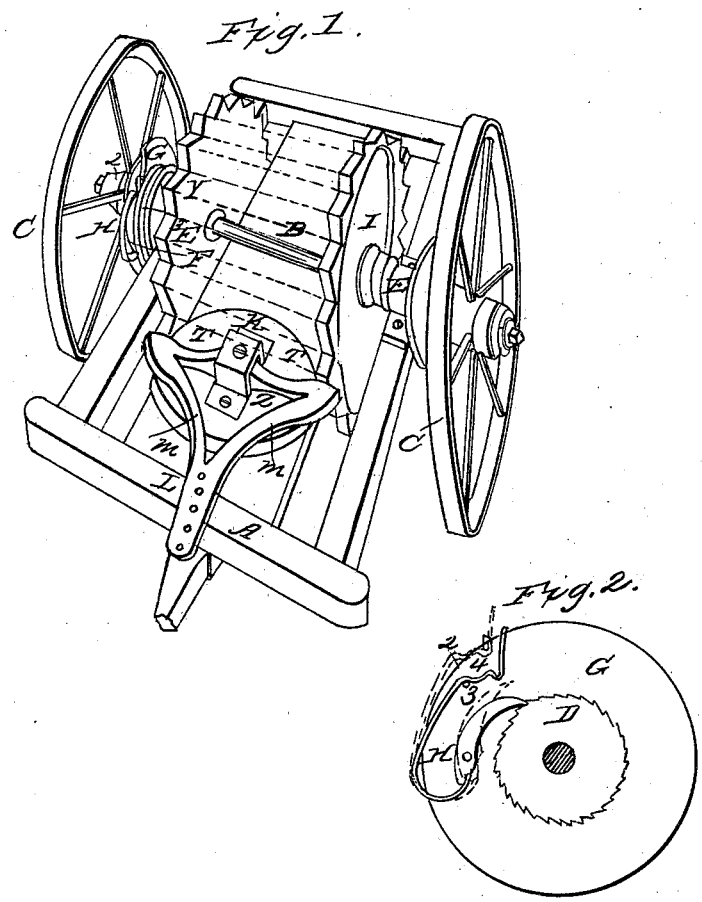

PHILIP DYER, JR., OF UNADILLA, MICHIGAN, ASSIGNOR TO ROBERT P. MORDEN, OF SAME PLACE.

IMPROVEMENT IN HARVESTERS.

Specification forming part of Letters Patent No. 90,247, dated May 18, 1869.

*To whom it may concern:*

Be it known that I, PHILIP DYER, Jr., of Unadilla, in the county of Livingston and State of Michigan, have invented a new and useful Improvement in Mowing and Reaping Machines; and I do declare that the following is a true and accurate description thereof, reference being had to the accompanying drawings, and to the letters of reference marked thereon, and being a part of this specification.

Figure 1 is a view of my invention in perspective from the under side. Fig. 2 is a section, showing the ratchet and spring-pawl.

Like letters indicate like parts in each figure.

My invention relates to certain improvements in the devices for giving a reciprocating motion to the cutters of harvesters, hereinafter more fully set forth.

A is a suitable frame, secured by proper bearings upon the axle B. C are traction-wheels, secured to the axle B in the usual manner. D are ratchet-wheels, rigidly secured to the axle B upon each end thereof, just adjoining the inner ends of the hubs of the wheels C. E are pulleys, also rigidly secured to said axle next to the ratchet-wheels D, by means of which and proper belts motion is given to any suitable rake or reel, which may be attached to the platform of a reaper. F is a pawl, secured and pivoted to the face-plate G of the wheels C, and actuated by the curved spring H, by means of which the pawl is made to engage with or disengage from the ratchet-wheels D. The object of these pawls and ratchets is to allow the wheels C to rotate freely upon the axle when desired, or to compel the axle to rotate with the said wheels when it is desired to give motion to the knives.

I are star-wheels, two in number, rigidly secured to the axle B just inside the longitudinal bars of the frame. These star-wheels are so arranged upon the axle and relative to each other that the points in one are directly opposite and in line with the roots of the star-points on the other, as indicated in red lines.

J represents a vibrating lever, pivoted at its center K to the disk Z, the latter being secured to the frame A. The disk Z can readily be removed and attached to the rear part of the main frame, so as to make the machine a front or rear cut machine. By this arrangement, also, the arms $m$ $m$ of the lever and the rear portion of the lever which connects the arms $m$ $m$ have their bearings on and are supported by the disk Z. The ends of the levers on the rear side are chamfered, both at top and bottom, so as to be V-shaped. To this lever is secured the pitman, which is attached to the cutter-bar.

This arrangement may be placed and connected with the sickle-bar, so that said bar may operate on either side of the machine, and it may be placed, as above described, so as to drive said knives in front or in rear of the traction-wheels.

The operation of the device is so simple that it needs no explanation, except so far as the operation of the spring-clutch is concerned. When it is desired to give motion to the star-wheels and their connections, it becomes necessary to hook the spring H, at notch 2, onto the pin 3, which projects from the side of the face-plate G. By this means the outer end of the pawl is elevated, compelling the other end to engage with the ratchet-wheel. By releasing the spring and hooking it upon the same pin at notch 4, the pawl is released from its engagement with the ratchet-wheel, and the wheels C will then rotate freely upon the axle, while the star-wheels will remain stationary with the axle, pulleys, and ratchets.

What I claim as my invention, and desire to secure by Letters Patent, is—

1. The removable disk Z, supporting the vibrating lever J, substantially as described.
2. Also, the arrangement of the main frame, the axle, star-wheels I I, the disk Z, and the lever J, substantially as described.

PHILIP DYER, JR.

Witnesses:
LOUIS C. HYDE,
H. F. EBERTS.